March 9, 1954 A. W. RICHARDS ET AL 2,671,476
PORTABLE BELT-DRIVEN POWER HANDSAW
Filed Feb. 2, 1950 5 Sheets-Sheet 1
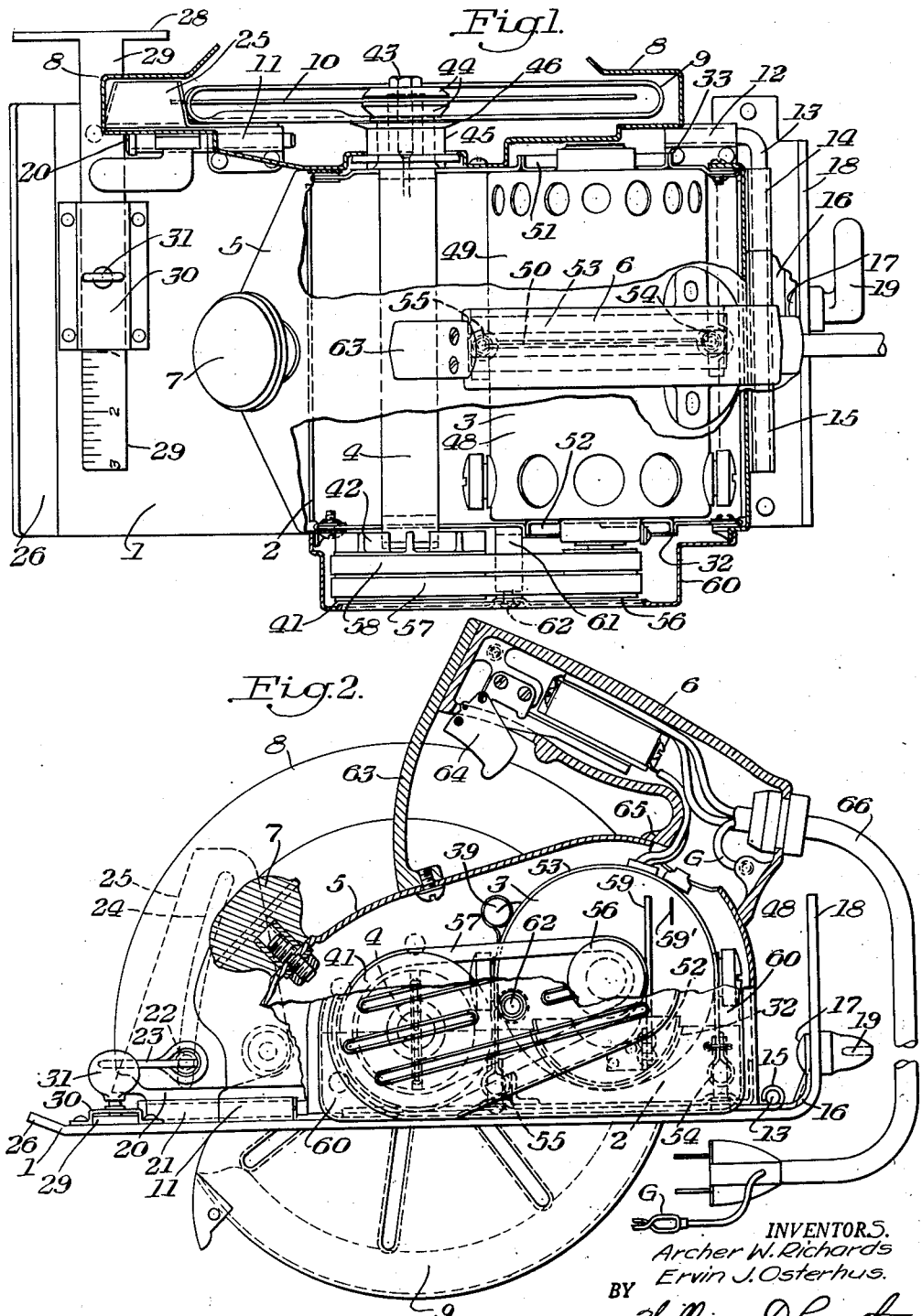
INVENTORS.
Archer W. Richards
Ervin J. Osterhus.
BY
William D. Carothers
THEIR ATTORNEY March 9, 1954  A. W. RICHARDS ET AL  2,671,476
PORTABLE BELT-DRIVEN POWER HANDSAW
Filed Feb. 2, 1950  5 Sheets-Sheet 2
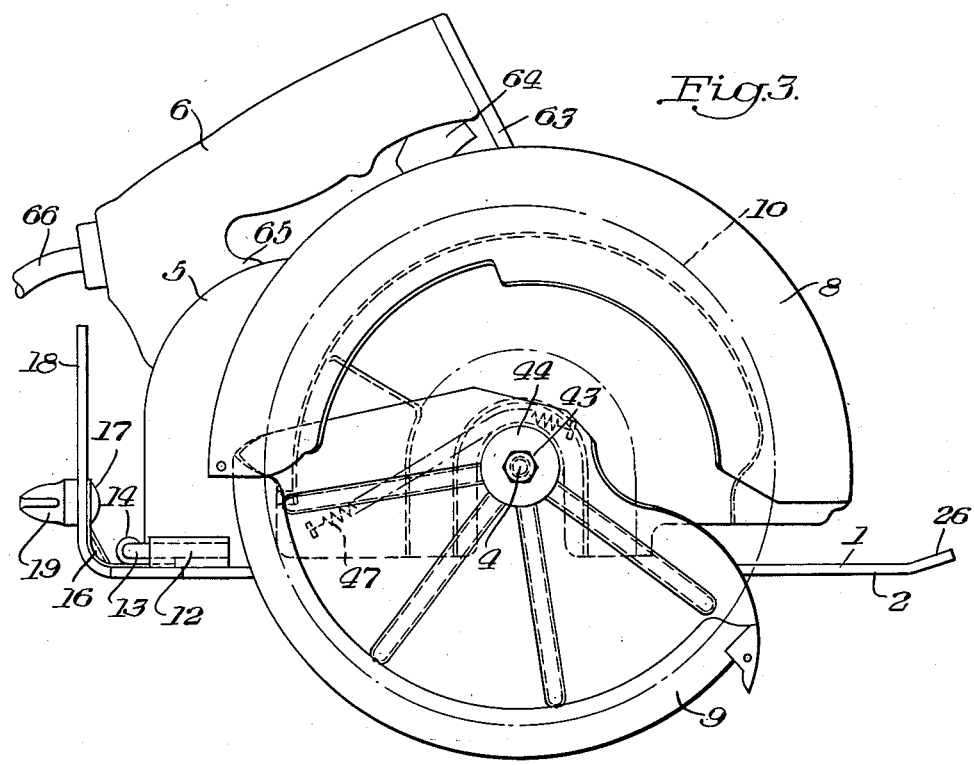
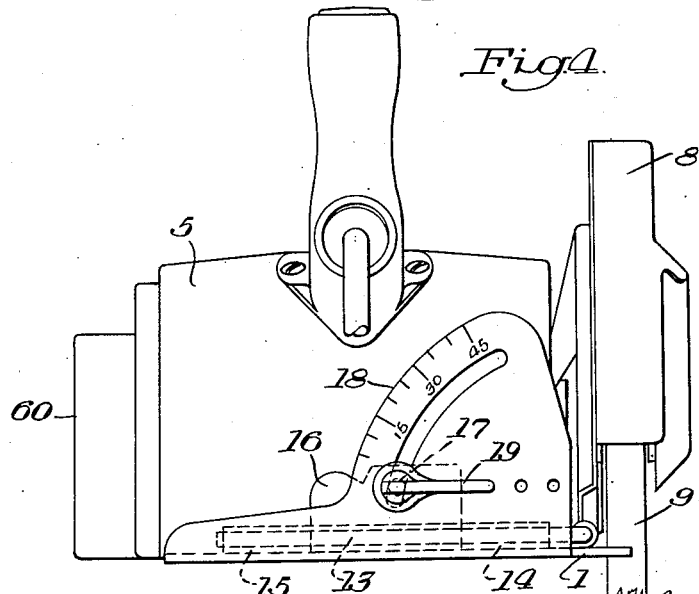
INVENTORS.
Archer W. Richards
Ervin J. Osterhus.
BY William D. Carothers
THEIR ATTORNEY

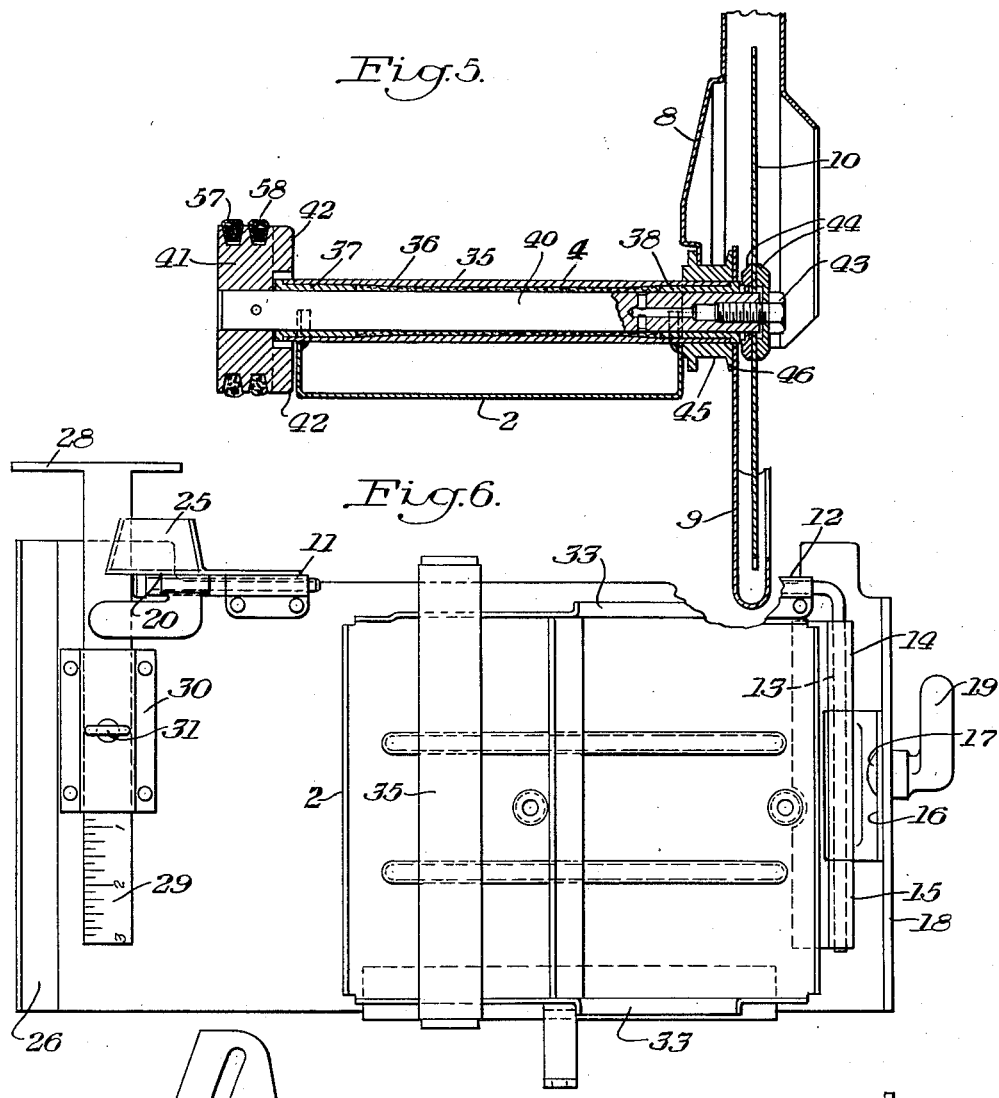
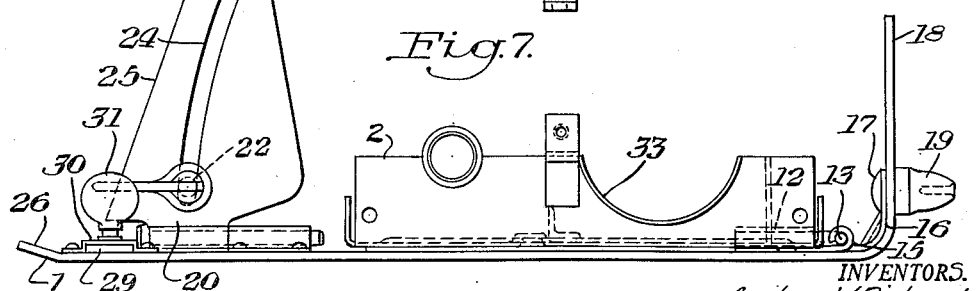

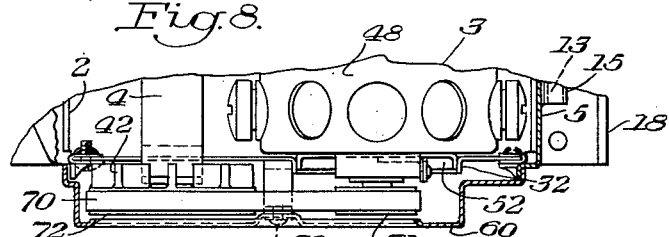
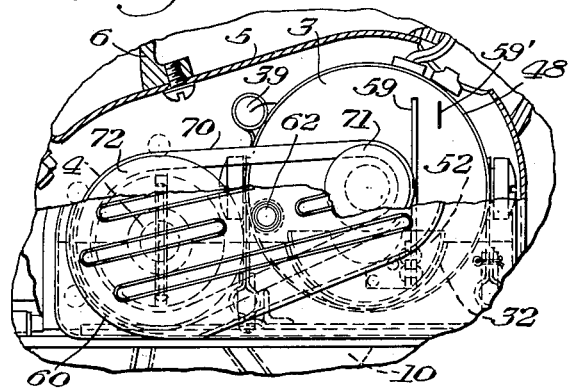
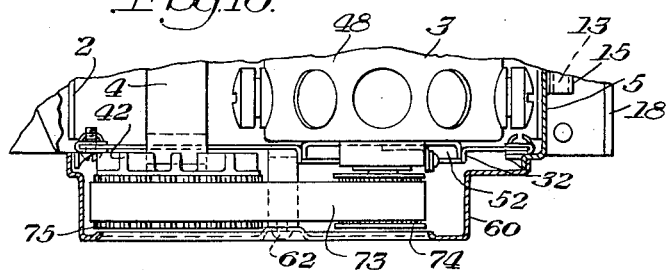
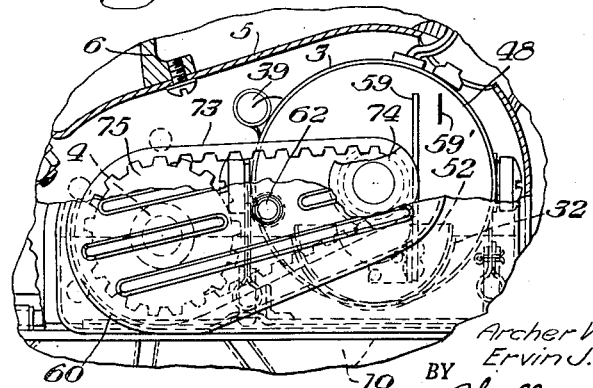

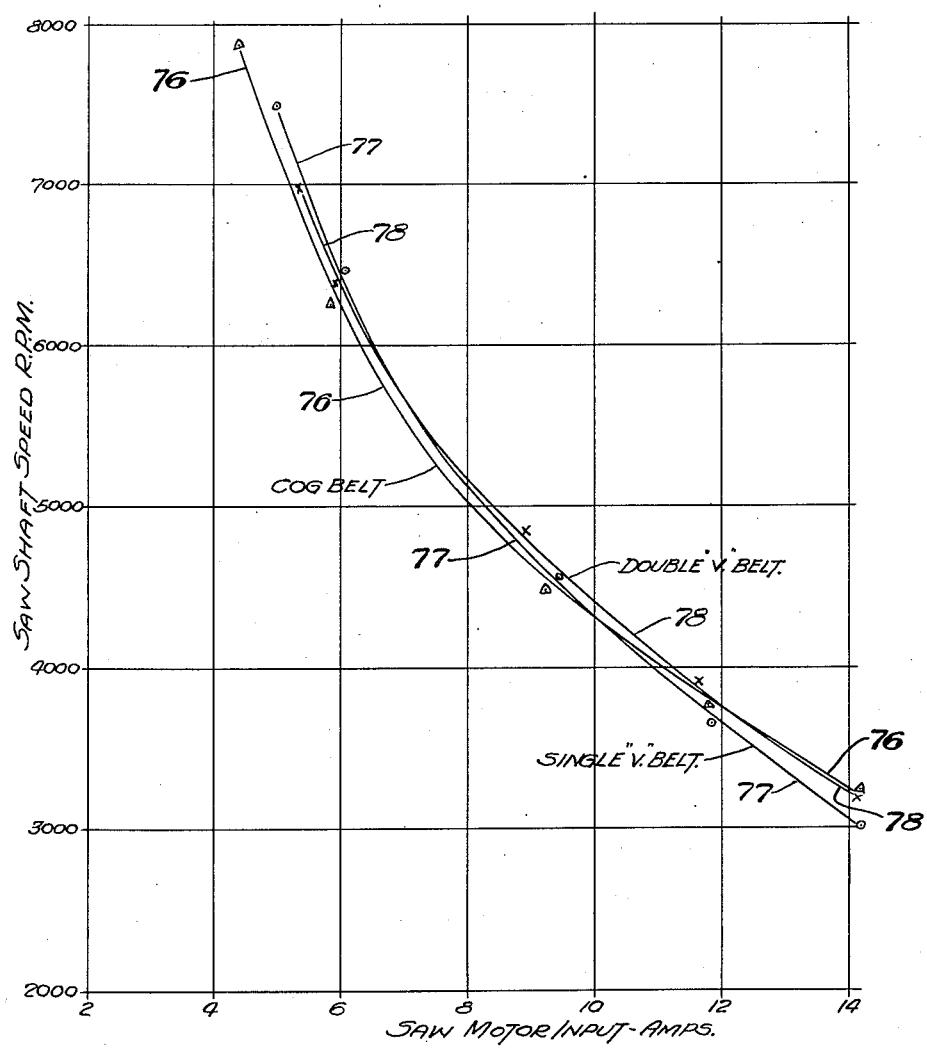

Patented Mar. 9, 1954

2,671,476

UNITED STATES PATENT OFFICE 2,671,476

PORTABLE BELT-DRIVEN POWER HANDSAW

Archer W. Richards, Chagrin Falls, and Ervin J. Osterhus, Cleveland, Ohio, assignors to Syntron Company, Homer City, Pa., a corporation of Delaware Application February 2, 1950, Serial No. 142,066

3 Claims. (Cl. 143—43)

This invention relates generally to motor operated portable hand saws, and more particularly to belt-driven hand saws.

Motor operated belt-driven hand saws have been suggested in the art as disclosed in Wertz, 1,663,486, of March 20, 1928, yet this saw was not successful commercially probably owing to the impracticability of its structure and design. It is obviously too heavy and bulky and difficult to manipulate. The center of mass is not properly located relative to the handle. It shows an induction motor the speed of which is less than that of the saw requiring a step-up transmission. A gear-driven motor hand saw was much smaller and very neat in design. The gear saw became very popular, yet the gears wear out in a relatively short time and they are quite noisy.

The motor operated belt-driven hand saw comprising this invention provides a higher speed series motor that is light in weight and readily manipulatable. The speed is reduced to the saw which is quiet and efficient in its operation. The structure of this novel hand saw permits it to cut in a plane disposed angular to the side of the saw and to the surface of the board being cut. The base of this saw may also be adjusted to determine the depth of the saw cut, all of which makes this hand saw less dangerous to handle.

This compact belt-driven hand saw provides a long lubricant-packed shaft with the saw blade on one end and a double grooved pulley on the other end for using two V-belts to drive the saw. Two V-belts are employed owing to the close proximity of the motor and saw shaft and the small motor driving pulley which provides only a short arcuate belt engaging surface. These structural features provide long life with durability and permit the transmission of adequate power to the saw blade for properly performing its work. The gear type drive is inadequate for the transmission of power and even at light loads it soon wears out.

This belt-driven hand saw is provided with spaced cradle sockets for supporting the motor. The surfaces on the motor which are received in the cradle sockets are eccentric to its rotary shaft. Thus, a slight turn of the motor housing in its sockets increases or decreases the distance between the motor shaft and the blade shaft to enable one to adjust the tension on the belt drive.

Another structural characteristic of this belt-driven hand saw is the disposition of the two handles relative to the center of mass. The motor shaft and the saw blade shaft are parallel and the principal handle is above and slightly in back of the motor which is the heaviest part. A hand knob is located above and slightly forward of the saw shaft. This arrangement properly distributes the weight of the tool making it very easily handled and manipulated.

Another object is the provision of spring means by which constant tension of the belt may always be uniformly measured and adjusted regardless of wear.

Another object is the provision of a belt-driven hand saw wherein the motor and saw shafts are parallel and close together making a compact tool.

Another object of this invention is the provision of a simple structure that is economical to manufacture. The stampings forming the tool base and the wood engaging surface together with the several parts of the housing are simple structures readily assembled. The motor being mounted under the housing, needs no heavy exterior shell. It is in the form of two deeply drawn cups having sockets for receiving the shaft bearings and the arcuate eccentric supporting surfaces are secured on the ends of these cups by welding. The motor is held by a strap which may be loosened to shift the motor and tighten the belt.

A long sleeve bearing is employed to rotatably support the saw shaft. This bearing may be packed and thus be sealed off. The long bearing adds many more hours of life to the saw as it properly resists lateral shock such as experienced when the saw first engages the material it is to cut or a hard spot during the cutting thereof.

Other objects and advantages appear in the following description and claims.

The accompanying drawings show, for the purpose of exemplification without limiting the invention or claims thereto, certain practical embodiments of the invention wherein:

Fig. 1 is a plan view of the belt-driven hand saw comprising this invention;

Fig. 2 is a view in side elevation of the structure shown in Fig. 1;

Fig. 3 is a view in side elevation of the opposite or saw side of the hand tool;

Fig. 4 is a rear elevational view of the hand tool;

Fig. 5 is a sectional view of the saw and its arbor;

Fig. 6 is a plan view of the frame and adjustable base of the saw;

Fig. 7 is a view in side elevation of Fig. 6;

Fig. 8 is a view in horizontal section of a single belt drive with parts being broken away;

Fig. 9 is a view in vertical section of the structure shown in Fig. 8;

Fig. 10 is a view in horizontal section of a single cog belt drive with parts being broken away;

Fig. 11 is a view in vertical section of the structure shown in Fig. 10; and

Fig. 12 is a graph of the speed v. current load for the three types of belt transmission, single V-belt, double V-belt and cog belt.

Referring to the drawings, it will be noted that the hand saw comprising this invention is made up of an adjustable base 1 which is hingedly attached to the base plate or frame member 2 that supports the series motor 3 and the saw shaft 4. The frame member 2 also has the housing 5 attached thereto which is provided with the grip handle 6 and the hand knob 7 and is also arranged to carry the upper fixed shield 8 and the lower adjustable shield 9 for the saw blade 10. The grip handle 6 has a support guard 63.

The adjustable saw base 1 is shown more in detail in Figs. 6 and 7 and is provided with the aligned hinged sockets 11 and 12 for receiving the one leg of the hinge pin 13. The other leg of the hinge pin 13 is pivotally retained in the aligned hinge sockets 14 and 15 which are welded to the rear end of the frame 2. In view of the fact that the single hinge pin 13 has two legs disposed at 90° to each other and since the hinge sockets 11 and 12 are secured to the base 1, it is obvious that the outer end of the base 1 may be swung on the axes of the sockets 11 and 12 toward and away from the frame 2 to provide a relative angular position of the saw blade to the under surface of the base 1. The saw has to be turned in the proper direction to determine the direction of this outer cut relative to a plane normal to the underside of the base 1.

On the other hand, it is also noted that the front end of the base 1 may be swung toward and away from the frame 2 as the base is also pivoted on the other leg of the pin 13 that lies in the hinge sockets 14 and 15. With this adjustment the forepart of the base 1 is moved toward and away from the saw and the rear part is held by the hinge pin in a fixed pivoted position relative to the saw. If the base 1 is close to the underside of the frame 2 it will be parallel therewith and the front end may be moved toward or away from the shaft 4 carrying the saw 10, thereby providing different depths of cut for the saw blade 10. Both the angular and depth adjustment of the base 1 may be made simultaneously relative to the saw blade.

A member 16 is pivotally hinged on the hinge pin 13 intermediate of the sockets 14 and 15 and extends upwardly to support the clamping bolt 17 which rides through the arcuate slot in the arcuate gauge plate 18 which is provided with numerals indicating the angular degree of the underface of the base plate 1 relative to the saw. The bolt 17 is held in any desired position in its arcuate slot by means of the winged clamping nut 19. The center of radius of the arcuate slot is of course taken from the axis of the sockets 11 and 12.

A member 20 is provided with a socket 21 for receiving the outer end of the hinge pin 13 adjacent the socket 11. The member 20 extends upwardly to receive the bolt 22 that is clamped in place by means of the nut 23. The bolt 22 is adjustable along the slot 24 in the gauge plate 25 which is supported integrally relative to the housing 5 and the arcuate slot 24 has for its center of radius the axis of the sockets 14 and 15 secured to the end of the frame 2. Thus, when the base is pivoted on the axis of the sockets 14 and 15 and the front end swings downwardly to determine the depth of the sawcut, it may be clamped in any desired position along the slot 24 so as to properly gauge the saw relative to the undersurface of the base plate 1.

The extreme front end of the base plate 1 is turned upwardly to form a lip 26 which permits the base to be slid over the wood or a series of boards that might be rough or otherwise uneven in sawing the same, such as sawing off the ends of the roof boards that project beyond the eave of a house. A lateral gauge 28 is secured to a stem 29 that is marked as a scale and slides through the socket 30 and may be secured by the set screw 31. The relative position of the gauge 28 and the saw blade 10 may be set by shifting the stem 29 to a desired position and clamping the same by means of the clamping screw 31 in the socket 30.

Referring again to Figs. 6 and 7, the base plate or frame 2 is provided with oppositely disposed arcuate cradle surfaces 33 to receive the motor 3. The parallel cradle surfaces are arranged to receive the tube 35 which is shown in detail in Fig. 5 and contains two bearing sleeve sections 37 and 38. Intermediate the bearing sleeves 37 and 38 an annular oil wick 36 is inserted and may be supplied with oil through the axial and radial passages by removing the saw blade mounting screw 43 which also closes the oil reservoir formed by the axial and radial passages in the shaft 40. The bearing sleeves 37 and 38 have flanges which cover the ends of the tube 35. The saw shaft 40 is arranged to rotate in the composite bearing sleeve mounted in the tube 35. A double grooved pulley 41 is secured to one end of the shaft 40 and a series of fan blades 42 are on inner face of the pulley for the purpose of creating a draft to circulate air from the left side of the housing 5 toward the saw to cool the pulley and prevent the deposit of sawdust within the housing. The fan prevents quiescence in the housing and any time that sawdust tends to creep in it provides circulation for discharging the same. In this manner the motor and other parts are kept clear of sawdust, yet they are not sealed in and are cooler in operation.

The opposite end of the shaft 4 has the saw blade 10 secured thereto by means of the nut 43, the blade being held between the washers 44. It will be noted that the tube 35 extends beyond the upwardly extending wall of the base 2 for the purpose of functioning to receive the bearing sleeve 45 to which is journaled the cover 8. The outer end of the bearing sleeve 45 has the movable shield 9 secured thereto, as indicated at 46, and is permitted to rotate about the axis of the saw. This shield is provided with a spring, as indicated at 47, to keep the shield 9 in its fully extended position, as indicated in Fig. 3.

The motor 3 is a universal motor being series wound and operating at a speed of approximately twelve thousand R. P. M. It is encased in two cup-like housings, three and three-fourths inch in diameter, as shown at 48 and 49, which are shoved over the ends of the motor field and are provided with flanges that come together, as indicated at 50. Each cup-shaped housing is provided with an arcuate supporting surface, as shown at 51 and 52, which are arranged to rest in the cradles 33 and 32, respectively, of the base 2. A strap member 53 is secured at one end to the base 2, as shown at 54, and extends over the flanges 50, and is also adjustably secured at its other end to the base 2, as indicated at 55, for the purpose of tightly clamping the motor down to the base 2. The motor 3 has a condenser 39 to check radio interference and is likewise provided with a double-grooved pulley 56 approximately one and one-quarter inch in diameter for receiving the belt members 57 and 58 that extend from the motor pulley to the saw pulley 41 which is approximately two and one-half inches in diameter which provides approximately 12,000 surface feet per minute for an eight inch saw blade. The arcuate supporting surfaces 51 and 52 are eccentric to the shaft of the motor and, thus, any relative arcuate adjustment of the motor will determine the tension on the belts 57 and 58. It is necessary for one to remove the cover 5 and loosen the strap 53 and shove against the spring 59 until it aligns with the mark 59′ to rotate the motor to a posiiton where the tension on the belt is proper and in accordance with the pressure of the flexed springs and then reclamped. This uniform tension on the belts may be made when the motor is stationary or operating the saw. These mating arcuate cradle surfaces may be knurled or roughened to prevent the motor from slipping from its adjusted position.

The principal housing 5 encases the whole of the motor and the majority of the tube carrying the shaft 4 and has attached thereto the separate housing 60 which encloses the belts. The housing 60 joins the housing 5 to lock the latter in position and it is supported by the bracket 61 which is welded to the base 2. The housing 60 is held in place by the bolt 62, as shown in Fig. 1.

The grip handle 6 contains the electric switch actuated by the finger trigger 64. It will be noted that the butt end 65 of the handle is attached to the rear of the housing 5 above and to the rear of the motor 3; whereas the knob handle 7 is secured to the front of the housing ahead of the sleeve 4. This disposition of the handles properly places the center of mass between the handles 6 and 7 thereby permitting the operator to readily manipulate the saw. The wires coming from the current supply in the cable 66 pass into the handle 6 to the switch and thence back to the motor 3. It will be noted that the switch is a double pole switch and both lines are open when the saw is turned on. A third wire in the cable may be used to ground the saw. The cable 66 is provided with a ground wire that is connected to the inside of the handle below the rubber cable bushing and may have a ground clip at its other end.

The saw shaft 4 is parallel to and very close to the shaft of the motor 3 to concentrate the weight directly under the handle 6. This provides a very compact saw with these shafts as close as the size of the pulleys permit without requiring more than two belts. In the structure shown the motor 3 may be adjusted on the arcuate bearing surfaces so that the axes of the saw shaft and motor shafts are from three and one-quarter to three and five-eighths inches apart. This provides three-eighths inch for wear and belt adjustment. The saw shaft housing 35 may be spaced from the motor casing 48, 49 as little as two and three-eighths inches to as much as four and one-half inches since the tubing 35 is approximately one inch in outside diameter; whereas the casing 48, 49 is three and three-quarter inches and the pulleys have a ratio of approximately two and one-half to one. These dimensions provide important factors in the makeup of this belt type portable saw.

In Figs. 8 and 9, a single V-belt 70 is used to transmit power from the motor 3 by the single grooved pulleys 71 and 72 on the series motor and saw shafts respectively. The saw shaft pulley 72 has the cooling fan 42 on its inner face to dissipate the frictional heat developed by the belt 70. The driving and driven pulleys are the same size as pulleys 41 and 56.

In Figs. 10 and 11 a single cog belt 73 is used to transmit power from the motor to the saw shafts. A cog pulley 74 is provided on the motor shaft and a cog wheel 75 is provided on the saw shaft.

In the transmission of power the cog belt has little or no friction losses as compared to the single or double belt drive, yet all three drives provide smooth operation under load with a cushioning effect between the high torque series motor and the saw blade. It is also possible to use greater pulley ratios and a higher speed motor with the same diameter saw because there is no slippage with a cog belt. A smaller driving pulley and closer centers between the saws and motor shafts may be used with a cog belt which would be impossible with V-belts. However, there are limitations such as the top no-load speed of a saw. A saw blade has a critical no-load speed at which it will flutter and vibrate. This action will probably result in fatigue and cracking. The no-load high speed flutter also causes a rough cutting at the start of the saw stroke which is decidedly undesirable. A saw blade eight and one-half inches in diameter, which is employed on the saws disclosed herein, has a critical flutter at no-load with speed of 7,200 R. P. M. and a definite flutter at 7,400 R. P. M.

The performance curves shown in Fig. 12 illustrate the different speeds attained for different loads from no-load to full-load. Curve 76 is the cog belt drive, 77 the single V-belt drive and 78 the double V-belt drive. It will be noted that for the same series motor and diameter of pulleys the cog belt drive provides a much higher no-load speed. This is due to the fact that there is no slip and the speed is way above the flutter speed. In order to use this cog belt drive, it would be necessary to increase the pulley ratios and lower the no-load speed.

The single V-belt drive also has a higher no-load speed because the transmission losses are not high and to use this transmission the pulley ratios would likewise have to be increased to bring the no-load speed down. There is a limit to the size of the pulleys that can be employed. When the driving pulley cannot be made any smaller and the driven pulley cannot be made any larger without raising the saw shaft higher from the base plate, then the depth of cut has to be sacrificed. If a larger diameter saw is required, then a more powerful motor is necessary thereby increasing the weight of the saw.

To avoid these difficulties the double V-belt drive provides the answer. This is shown by the curve 78. At no-load the efficiency is poor and the best speed attainable for the same motor and the eight and one-half inch saw blade is approximately 6,900 R. P. M. which is below the critical flutter speed. However, at a load greater than normal full load, the transmission is substantially as efficient as the cog belt. Normal load is about ten amps. on these performance curves.

We claim:

1. A hand saw power tool consisting of a pressed metal base plate having an upwardly extending perimetral flange, two sets of aligned arcuate cradle surfaces in oppositely disposed sections of said flange, the axes of said arcuate cradle surfaces of both sets being spaced apart and parallel to each other, a rotary motor having arcuate surfaces on the ends thereof complementary to one set of said arcuate cradle surfaces and mounted therein for supporting said motor, the arcuate surfaces of said motor being disposed eccentrically to the rotary axis of the motor, a sleeve secured in the other set of said arcuate cradle surfaces, spaced bearings mounted in said sleeve, a shaft rotatable in said bearings and extending beyond the ends of said sleeve, a saw mounted on one end of said shaft, a pulley mounted on the other end of said shaft, a pulley on the corresponding end of said motor and in alignment with said shaft pulley, belt means connecting said pulleys to drive said saw, and strap means attached to said base to clamp said motor in its arcuate cradle surfaces at a selected position to apply tension on the belt.

2. A portable saw consisting of a base plate having a smooth continuous undersurface, a back plate extending upwardly from the base plate and secured at right angles thereto, a socket member secured to said base plate with its axis disposed normal to said back plate, a second socket member adjustably secured to the back plate with its axis disposed parallel therewith, a frame disposed above the base plate, a third socket member secured to said frame and aligned with said second socket, a power saw mounted on said frame with the saw extending below the base plate and in a plane disposed normal to said back plate, and a pivot rod having two legs disposed at right angles, one leg of said pivot rod operating in the first socket member and the other leg operating in the second and third socket members.

3. A hand saw power tool consisting of a pressed metal base plate having an upwardly extending perimetral flange, two sets of aligned arcuate cradle surfaces in oppositely disposed sections of said flange with their axes in parallel spaced relation, a rotary motor having arcuate surfaces on the ends thereof complementary to one set of said arcuate cradle surfaces but eccentric to the axis of said motor, bearing means secured to the other set of arcuate cradle surfaces on one side of said motor, a rotary shaft in said bearing means and having one end connected to be driven by said motor, a circular saw on the other end of said shaft extending below said base plate, a hinge member attached to the base plate on the other side of said motor with its axis parallel thereto, a work shoe covering the underside of the base plate and having an upwardly extending back plate with an arcuate slot, a second hinge member mating with the first hinge member and having an adjustable clamp movable in said arcuate slot, a right angle hinge pin having one end pivotally held within said first and second hinge members, a third hinge member attached to said work shoe in alignment with the axis of said arcuate slot and adjacent the saw to receive the other end of said hinge pin, a second clamping plate having an arcuate slot and hinged to said base plate in alignment with the axis of said third hinged member, the slot in the second hinge plate having its axis in alignment with the first hinge members, and clamp means attached to said work shoe and operating in the slot of the second clamping plate, whereby the work shoe may be adjusted relative to the base plate to provide different effective saw cut depths at different angular positions.

ARCHER W. RICHARDS.
ERVIN J. OSTERHUS.

References Cited in the file of this patent

UNITED STATES PATENTS

| Number | Name | Date |
| --- | --- | --- |
| 765,141 | Killam | July 12, 1904 |
| 1,323,490 | Putnam | Dec. 2, 1919 |
| 1,393,990 | Ford | Oct. 18, 1921 |
| 1,568,328 | French | Jan. 5, 1926 |
| 1,623,290 | Wappat | Apr. 5, 1927 |
| 1,663,486 | Wertz | Mar. 20, 1928 |
| 2,001,823 | Knowlton | May 21, 1935 |
| 2,204,402 | Cooper | June 11, 1940 |
| 2,259,092 | Trebert | Oct. 14, 1941 |
| 2,268,305 | Reinhard | Dec. 30, 1941 |
| 2,315,467 | Wahlberg et al. | Mar. 30, 1943 |

FOREIGN PATENTS

| Number | Country | Date |
| --- | --- | --- |
| 736,593 | France | Sept. 20, 1932 |